Sept. 1, 1970　　　　W. G. ATWATER　　　　3,526,327
STORAGE AND ORDER PICKING SYSTEM
Filed Jan. 26, 1968　　　　　　　　　　　　5 Sheets-Sheet 1

INVENTOR.
WAYNE G. ATWATER
Baldwin, Egan, Walling & Fetzer
ATTORNEYS

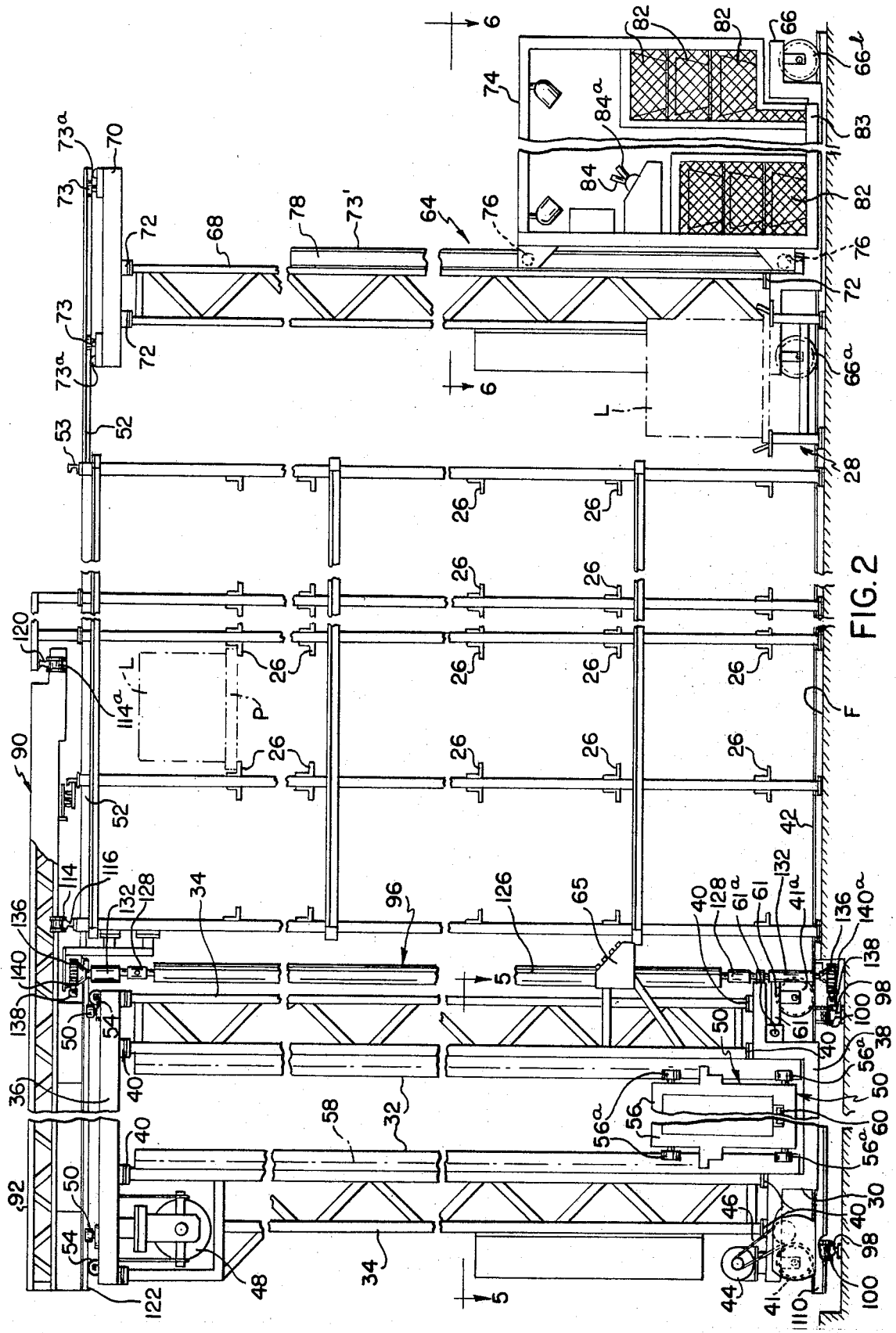

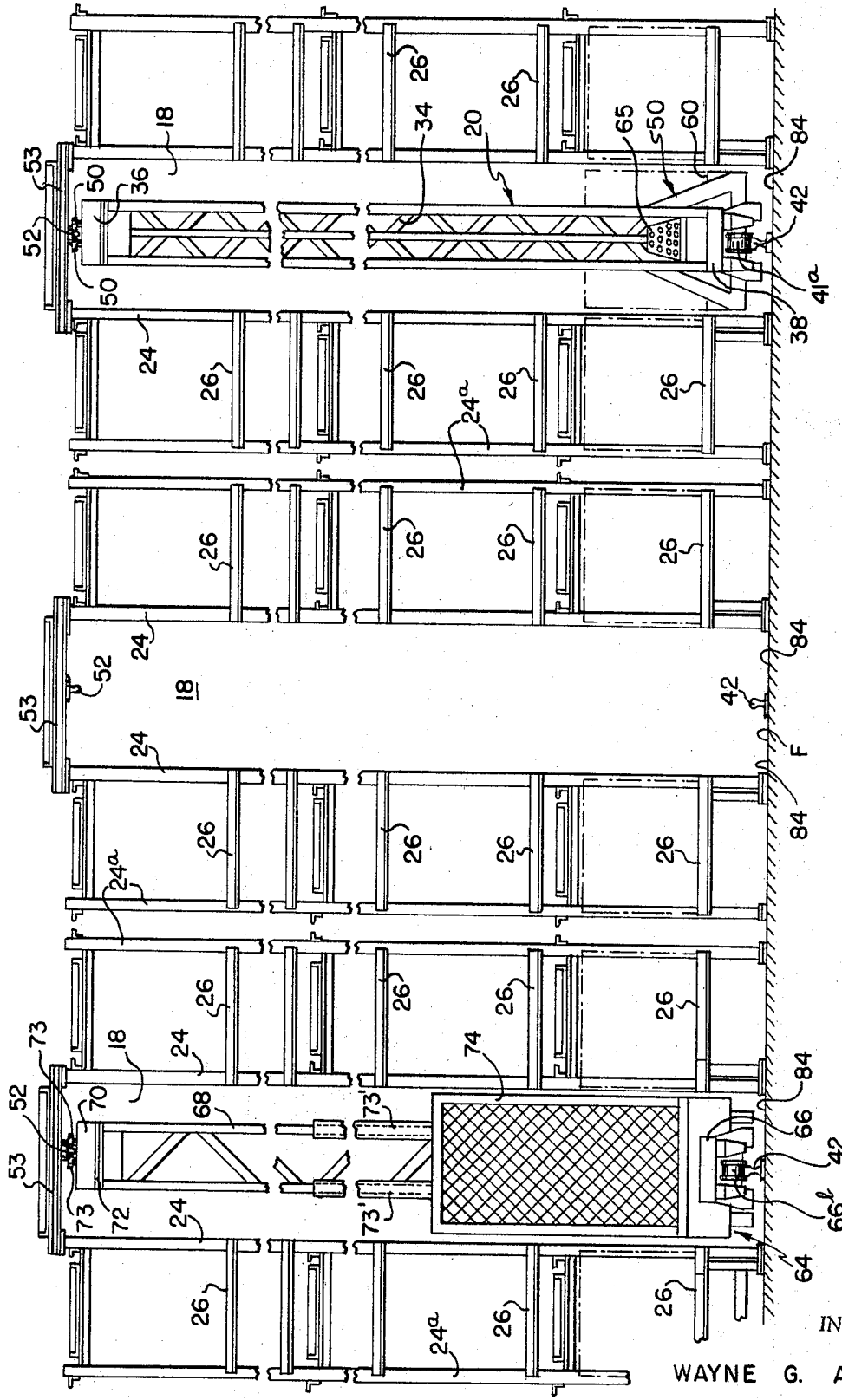

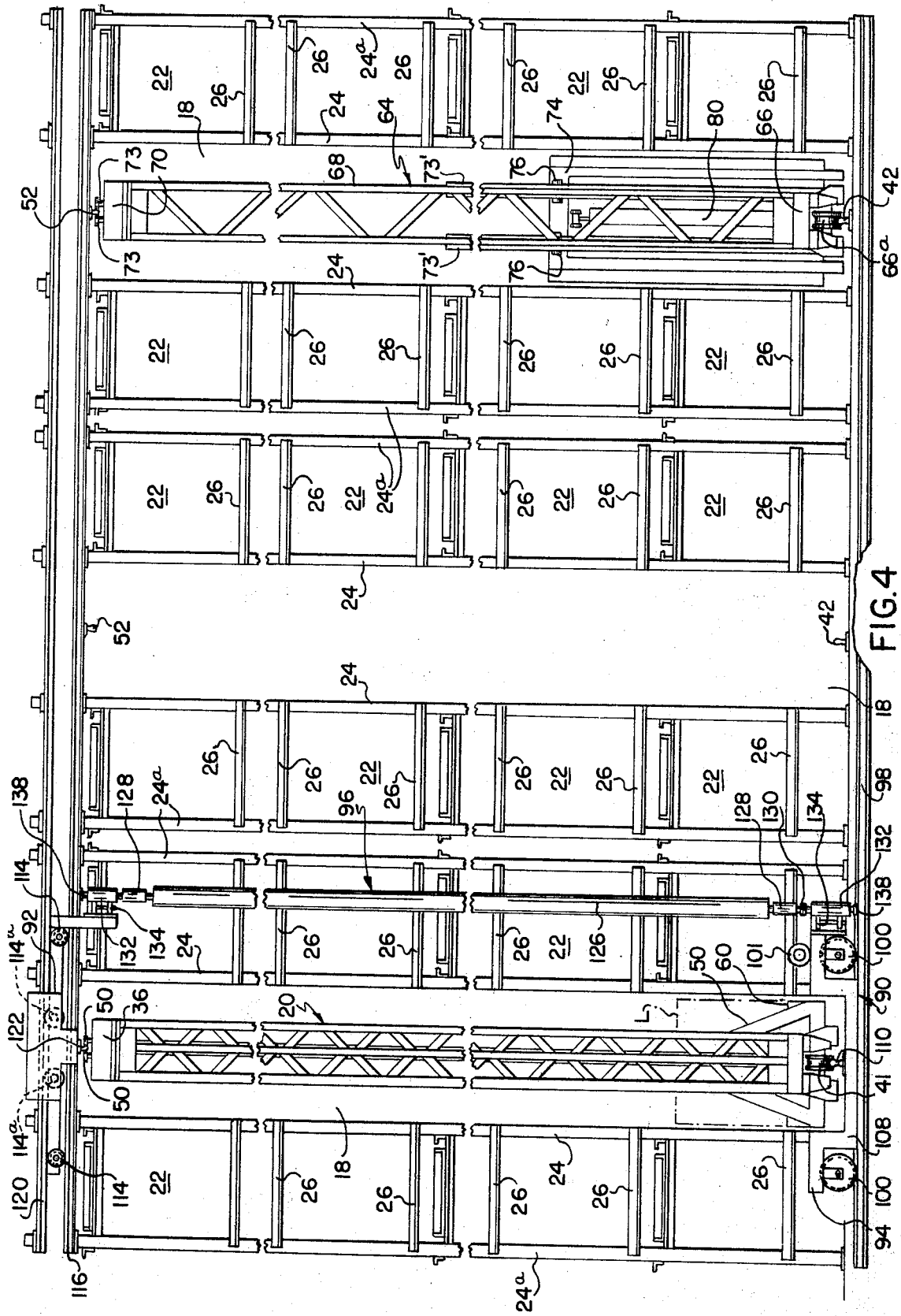

United States Patent Office 3,526,327
Patented Sept. 1, 1970

3,526,327
STORAGE AND ORDER PICKING SYSTEM
Wayne G. Atwater, Willoughby, Ohio, assignor to The Triax Company, Cleveland, Ohio, a corporation of Ohio
Filed Jan. 26, 1968, Ser. No. 700,787
Int. Cl. B65g 1/00
U.S. Cl. 214—16.4                                  20 Claims

ABSTRACT OF THE DISCLOSURE

An automatic warehousing system having a plurality of generally parallel-extending aisles or travel zones with storage bays disposed on one or both sides of each of the aisles, and with there being provided at least one automatic load carrier for servicing the storage bays of the aisles. There is also provided a manually controlled order-picking unit which is adapted to move in the aisles enabling a workman riding on the order-picking unit to selectively pick small amounts of the stock from the storage bins in the storage bays. A transfer mechanism is movable on tracks extending along an end of the aisles and associated storage bays, with the transfer mechanism being adapted to receive the main load carrier or the order-picking unit thereon and shift such load carrier or the order-picking unit from one aisle to another selected aisle, thus providing for servicing by the load carrier or by the order-picking unit, of a plurality of the aisles.

---

This invention relates in general to automatic warehousing systems for storing or unstoring loads by transfering them between a movable load carrier and a storage frame, and more particularly relates to an automatic warehousing system of the latter type which also includes a mechanized small order-picking unit for enabling a workman assembling small unit orders to expeditiously travel to the various storage bins in the storage frame and pick up individual items from the full loads in the storage bins, thus making it unnecessary to operate or tie up the automatic load carrier for filling small unit orders from the stored loads in the system.

Automatic warehousing systems for storing and unstoring loads, having an automatic load carrier and a plurality of travel zones or aisles providing for servicing a plurality of storage racks or storage bay sections, and with a transfer mechanism for transferring the load carrier from one travel zone or aisle to another travel zone or aisle, so that the load carrier can service a plurality of the aisles, are known in the art.

The present invention provides a warehousing system of the above general type in combination with a mechanized order-picking unit, enabling a workman to travel throughout the storage area of the warehousing system and pick up small unit orders from the larger stock loads located in the storage bins of the system, thereby making it unnecessary to tie up the automatic load carrier in order to fill small orders from the stock loads stored in the system. This materially increases the efficiency of filling orders from the stock stored in the warehousing system. Thus a more efficient and economically desirable automatic warehousing system is provided, since the order-picking unit does not need to possess the sophisticated equipment and large capacity required for the automatic load carrier unit. If so desired, the storage structures defining the individual storage bins can be built high, using the upper levels of the storage structure for reserve stock and the lower levels for order picking. The automatic load carrier unit can place the full loads of stock in the higher reserve stock storage bins, moving them down into the lower order-picking areas as such stock is needed.

Accordingly, it is an object of the present invention to provide a novel warehousing system.

Another object of the invention is to provide a novel warehousing system which includes an automatic load carrier unit for storing and unstoring loads in the storage frame of the system and also includes a smaller, less complex order-picking unit enabling small unit orders to be filled by the order-picking unit, without the necessity of bringing full stock loads to the head of the aisle to get accessibility to the stock items needed to fill an order and then necessitating returning the rest of the load to its original position in the storage frame.

Another object of the invention is to provide a warehousing system which includes a plurality of storage bays defining a plurality of travel zones therebetween and which includes an automatic load carrier for storing and unstoring loads, and a manually controlled order-picker unit movable in the system, for removing less than full stock loads from the storage bays, and wherein there is provided a transfer means for transferring either the load carrier and/or the order-picker unit from on travel zone to another travel zone, for servicing of the storage bays associated with each respective travel zone.

A still further object of the invention is to provide a warehousing system of the above-discussed type wherein the order-picker unit is of relatively simple construction and includes a mechanism for moving the order-picker unit both horizontally and vertically to a desired location for enabling an operator to remove stock items from the storage bins in the storage frame of the system.

A still further object of the invention is to provide an order-picker unit of the latter-discussed type wherein the unit includes a generally horizontally-movable carriage section and a generally vertically-movable elevator section with hydraulic power means for moving the elevator section vertically with respect to the carriage section.

Other objects and advantages of the invention will be apparent from the following description taken in conjunction with the accompanying drawings therein:

FIG. 1 is a generally diagrammatic, top-plan view of a warehousing system embodying the instant invention, with the system being illustrated as including one mechanized load carrier unit and one order-picking unit. The system illustrated is of a plural aisle type including a transfer means for transferring both the load carrier unit and the order-picking unit from one aisle to another aisle, thus providing for servicing of the various aisles by the units;

FIG. 2 is an enlarged, broken elevational view of the warehousing system showing the load carrier unit mounted on the transfer mechanism and showing the order-picking unit disposed at the head end of the aisle adjacent a pickup and discharge station;

FIG. 3 is an end-elevational view taken from the right-hand side of FIG. 2;

FIG. 4 is a broken end-elevational view taken from the left-hand side of FIG. 2 and illustrating the transfer mechanism which is adapted to transfer the load carrier and/or the order-picking units from one aisle to another aisle;

Figure 1:
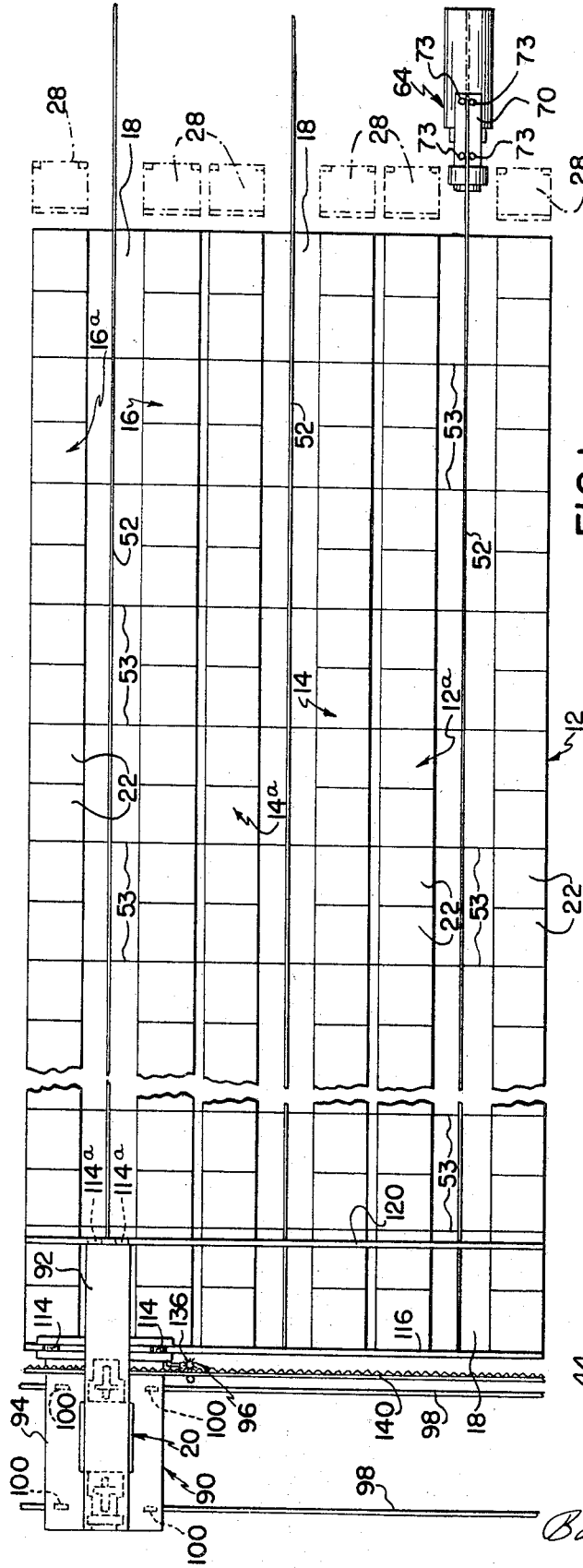

Referring now again to the drawings, the warehousing system illustrated comprises a plurality of generally parallel storage bay sections 12, 12a; 14, 14a; 16, 16a and so on, defining between each pair thereof (in the embodiment illustrated) an aisle or travel zone 18, so as to permit a motorized load carrier indicated generally at 20, to be moved along the aisle or travel zone and to insert loads into and withdraw loads from the load-support means or storage bins 22, formed by the storage bays.

Each storage bay may be constructed of a plurality of vertically-extending laterally-spaced posts 24, 24a (FIG. 4) spaced apart by a plurality of generally horizontally-extending load-supporting rails 26 defining a plurality of the aforementioned storage bins. Each pair of rails 26 are adapted to support a load L thereon (FIG. 2) which load may be supported, for instance, on a pallet or platform P which is supported in bridged relation between the laterally spaced rails. The loads may comprise box-like containers having, for instance, an open top and filled with individual units of stock so that if so desired, only a portion of the full load may be withdrawn from the respective container through the open top thereof without moving the container from its bin, or the loads may comprise individual stock units merely stacked on platform P. The storage frame construction may be of the general type disclosed in assignee's copending U.S. patent application, Ser. No. 484,845, filed Sept. 3, 1965, in the name of Anthony R. Chasar and entitled "Automatic Warehousing System" and reference may be had thereto for a more detailed discussion of structural details of a warehousing storage frame.

Disposed at one end of preferably each of the storage bay sections 12 through 16a, there may be provided a pickup and discharge station 28 which is adapted for receiving a load to be handled by the load carrier unit 20 prior to moving a load into the travel zone by the load carrier, and for receiving a load from the load carrier after such load has been removed from a selected bin by the load carrier and returned to the pickup and discharge station. As is well known in the art, the load carrier may also pick up a load from a storage bin in one storage bay section and transfer it to another storage bin in the same storage bay section or to a bin in another storage bay section.

Figure 5:
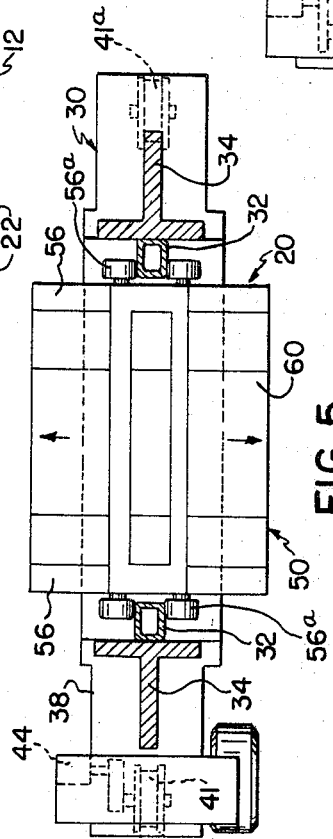
FIG. 5 is a diagrammatic sectional view taken generally along the plane of line 5—5 of FIG. 2 looking in the direction of the arrows.

The load carrier unit 20 may comprise a horizontally-movable conveyor frame portion 30 including generally upright mast structure formed by a pair of generally vertically-extending, preferably hollow track members 32 (FIGS. 2 and 5). Each track 32 may be reinforced as by means of an associated truss member 34 suitably coupled to the respective track member 32. The mast structure 32 and reinforcing truss structure 34 extend between upper and lower sections 36, 38 of the conveyor portion 30 of the load carrier and are secured thereto in generally rigid relation. Removable spacer means 40 may be provided for adjusting the connection between the upper and lower load carrier sections 36, 38 and the associated mast and truss structure.

The lower carrier section 38 may comprise a generally U-shaped (in side elevation) carriage frame supported on flanged wheels 41, 41a which in turn ride on a rail member 42 extending lengthwise of each of the travel zones and mounted, in the embodiment illustrated, on floor F of the storage area. The wheel base of the carriage section 38 of the load carrier unit 20 is preferably of such length as to be approximately one-third the height of the storage structure, to thus stabilize the load carrier unit as the upper section 36 moves along with the lower carraige section 38.

The lower carriage section 38 may be driven by means of a preferably reversible electric motor 44 (FIG. 2) mounted on carriage 38 and operably coupled as by means of drive mechanism 46 to the wheel 41, for driving the load carrier along the rail 42.

The upper section 36 of the load carrier may include a generally rectangular frame supporting a preferably reversible electric motor 48 operably coupled to the elevator portion 50 of the load carrier, for moving the elevator portion 50 vertically on mast tracks 32. Due to the rigidity of the load carrier framework including the mast structure 32 and reinforcing truss structure 34, the load carrier conveyor section 30 is maintained in good alignment with the vertical posts 24, 24a of the storage frame as the load carrier moves along the aisle to deposit loads in, or retrieve loads from, the storage bins.

The upper section 36 has laterally spaced rollers 50 (FIGS. 2 and 4) rotatably mounted thereon, which rollers coact in rolling engagement with rail member 52 running lengthwise of each of the aisles of the warehousing system. Rails 52 may be supported on the storage frame by cross structure 53 thereof. Rollers 50 guide the upper end of the load carrier structure in its horizontal movement along the respective aisle.

Safety rollers 54 disposed respectively adjacent the forward and rearward ends of the upper section 36 of the load carrier are also preferably provided. Rollers 54 are mounted for rotation about generally horizontally extending axes and are adapted to engage the underside of the upper guide rail 52 in the respective storage aisle, for preventing the load carrier from pitching forwardly in case of an emergency stop of the load carrier during its movement down the aisle. It will be seen that engagement of the rollers 54 with the underside of the guide rail 52 will definitely prevent tipping of the load carrier in a generally vertical plane. Rollers 54 are normally spaced from the underside of rail 52 and only engage rail 52 if the load carrier attempts to pitch in the direction of its movement.

The aforementioned elevator 50 may comprise side portions 56 having vertically spaced sets of rollers 56a rotatably mounted thereon, and adapted for rolling coaction with the aforementioned tracks 32 of the mast structure, for guiding the vertical movement of the elevator with respect to the conveyor portion 30 of the load carrier. The aforementioned power means 48 supported on the upper section 36 of the conveyor portion may be suitably coupled to conventional gear reduction mechanism which in turn may be suitably coupled as by means of a chain and sprocket drive to a shaft rotatably mounted on the upper section 36. Chains 58 (FIG. 2) may extend down to opposite ends of the elevator and coact with the latter-mentioned shaft for raising and lowering the elevator on the mast structure. The other ends of the chains 58 may extend into the interior of the associated hollow track members 32 and support vertically movable weights (not shown) thereon. Vertical upward and downward movement of the elevator 50 depends on the direction of rotation of the motor 48 while the hollow tracks 32 guide the upward and downward movement of the associated weights interiorly of the tracks on chains 58.

Mounted on the elevator 50 may be an extractor mechanism 60 which is adapted to move laterally of the elevator with a load supported thereon and deposit the load in the selected storage bin of the storage frame, or to move laterally of the elevator and pick up a load that is already in the storage frame and move it back to the desired pick up and discharge station. The extractor 60 preferably provides an extensible table with the table being extendable in either of the opposed directions transverse to the direction of movement of the load carrier in a traveling zone, so as to locate the extractor within either of the storage sections associated with each travel zone, effective to place the extensible table in position to deposit a load into or remove a load from a selected storage bin in a selected storage bay section. Suitable power means such as an electric motor may be provided operably coupled to the extractor for actuating the latter. Reference may be had to aforementioned U.S. patent application 484,845 for a more detailed disclosure of suitable extendable extractor mechanism.

When depositing a load in one of the storage bins of the storage frame, the elevator 50 and associated extractor 60 may be located opposite the selected storage bin such that as the load is moved into the selected bin the upper surface of the extractor is slightly above the horizontal flanges of the load supporting rails 26 mounted on the sides of and defining the bottom extremity of the selected bin. When the load is completely within the confines of the bin, the elevator may be lowered slightly to deposit the load onto the supporting angle members and permit retraction of the extractor back to its generally centered position with respect with the elevator.

Conversely when it is desired to move a load from a bin, the extractor or load supporting means 60 on the elevator is located such that the top surface of the extractor is extended into the bing slightly below the load. Thereafter the load supporting elevator may be raised so as to lift the load off its supporting angles 26 and the extractor is retracted back to its centered position, preparatory to moving the load carrier to its next position in the warehousing system.

Figure 8:
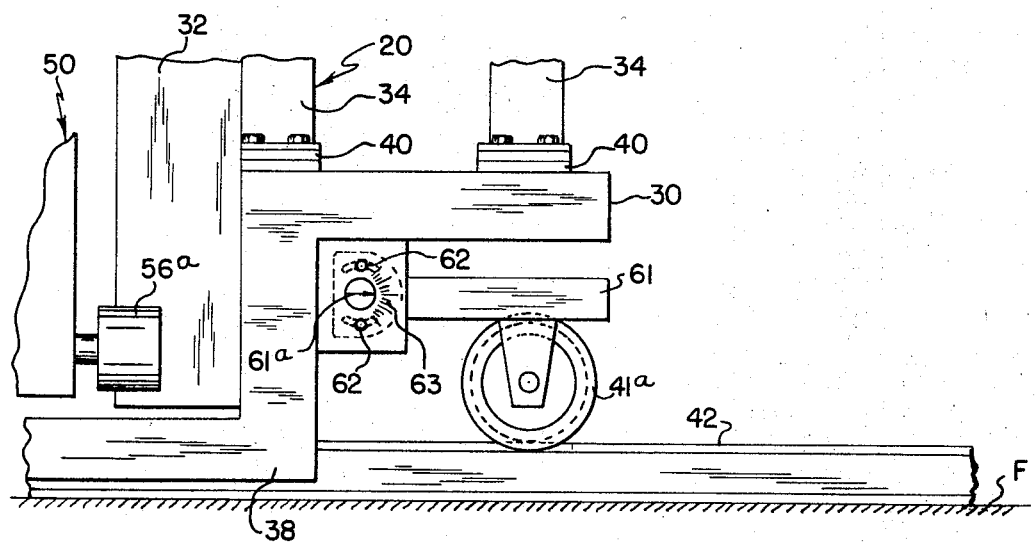
FIG. 8 is an enlarged detail view of the mounting of one of the support wheels of the load carrier unit.

Referring now to FIGS. 2 and 8, the support wheel 41a of the load carrier is mounted on structure 61 which in turn is swingably mounted as at 61a to the carriage 38 for movement in a generally vertical plane. Locking means 62 such as fasteners coacting in arcuate slots, may be provided for locking support structure 61 in whatever position selected. Such an arrangement enables adjustment of the position of the extractor 60 on the load carrier to the position of the load supporting rails 26 as installed in the storage frame, to compensate for variations in the storage frame structure, thus facilitating the fabrication and erection of the latter. A Vernier scale 63 may be provided on the carriage 30 and structure 61, as shown in FIG. 8, to indicate the amount of adjustment of structure 61.

The programmed operation of load handling cycle for the load carrier may be controlled by an electrical control circuit as disclosed, for instance, in the co-pending U.S. patent application, Ser. No. 414,048 of Sanford Saul, filed Dec. 14, 1964, and entitled Electrical Control Circuit for an Automatic Warehousing System. For example, with the load carrier disposed at a pickup and discharge station in the system, the load carrier may be automatically moved into the selected aisle and located sequentially opposite two storage bins in either of the storage bay sections or the same storage bay section. At each storage bin during the control interval, the extractor may be actuated so that a load will be deposited into or withdrawn from the bin. For example, a load may be deposited into the selected bin at the first position and a second load withdrawn from a bin at a second position and conveyed back to the afore-mentioned pick up and discharge station, or the handling cycle may conclude after the load handling at the first position in the system. Console 65 (FIG. 2) having various controls thereon for actuation by the warehousing operator may be mounted on the load carrier for programming of the load carrier. However it will be understood that the load carrier may be also programmed from a location remote from the load carrier, such as for instance by a computer or the like, for controlling the positioning of the load carrier in the warehousing system.

In accordance with the present invention, at least one mechanized order picking unit 64 is provided in the warehousing system. Order-picking unit 64 enables a workman riding on the unit 64, to move to any selected storage bin or bins in the storage system, and to remove the desired number of items from the bins for filling the orders that do not require the full load of stock that is located in the respective bin. This eliminates the necessity of operating the load carrier to bring full loads from the storage areas back to the pickup and discharge station, and then returning such loads to their original positions in the storage frame after removal of the desired number of stock items from the load. Such an order-picking unit is preferably manually operated by a workman who rides on the unit and reaches manually into the desired bin to remove stock for transfer back to the pickup and discharge station area, after which such stock items can be removed from the warehousing system.

Figure 6:
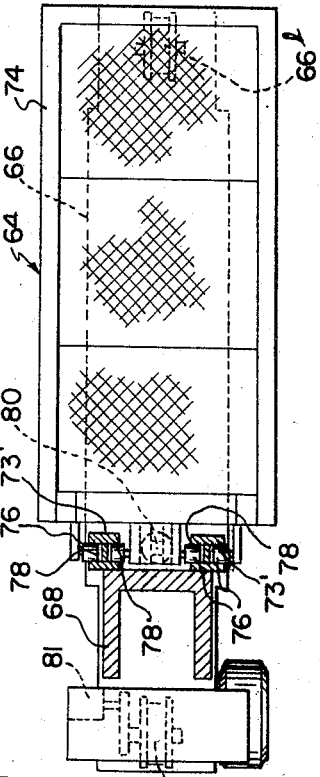
FIG. 6 is a diagrammatic sectional view taken along the plane of line 6—6 of FIG. 2 looking in the direction of the arrows and illustrating the order-picker unit.

Order picker unit 64 in the embodiment illustrated, comprises a lower carriage 66 supported on preferably flanged wheels 66a, 66b which are adapted to ride on the track 42 associated with each of the storage aisles. Carriage 66 supports a vertically extending truss structure 68 (U-shaped in transverse section—FIG. 6) which extends upwardly to be rigidly secured to an upper frame 70 of the order-picking unit. Removable spacer means 72 may be provided between truss 68 and upper frame 70 and lower carriage 66. Laterally spaced rotatable rollers 73 and safety rollers 73a may be provided on upper frame 70 of the order-picker unit for coaction with guide rail 52 in a similar manner as aforediscussed in connection with rollers 50 and 54 on the load carrier unit 20.

A vertical mast 73' extends upwardly from lower carriage 66 and is secured to the latter and to truss 68, for guiding the movement of the elevator frame 74. Elevator 74 may include vertically spaced guide rollers 76 which ride in grooves 78 formed in the mast 73', for guiding the movement of the elevator on the mast. A reciprocal fluid powered motor unit 80 (FIG. 4) may be provided coacting between the lower carriage 66 and the elevator 74, for moving the elevator vertically on the mast 73'. Motor unit 80 has an adequate stroke for moving the elevator 74 the full height of mast 73'. Extension of motor unit 80 raises the elevator frame 74, and the retraction of the motor unit lowers the elevator frame. The carriage 66 of the order picker unit 64 is adapted to be driven horizontally along track 42 by any suitable power means, such as for instance a reversible electric motor 81 operably coupled to the wheel 66a of the order picker unit.

Figure 7:
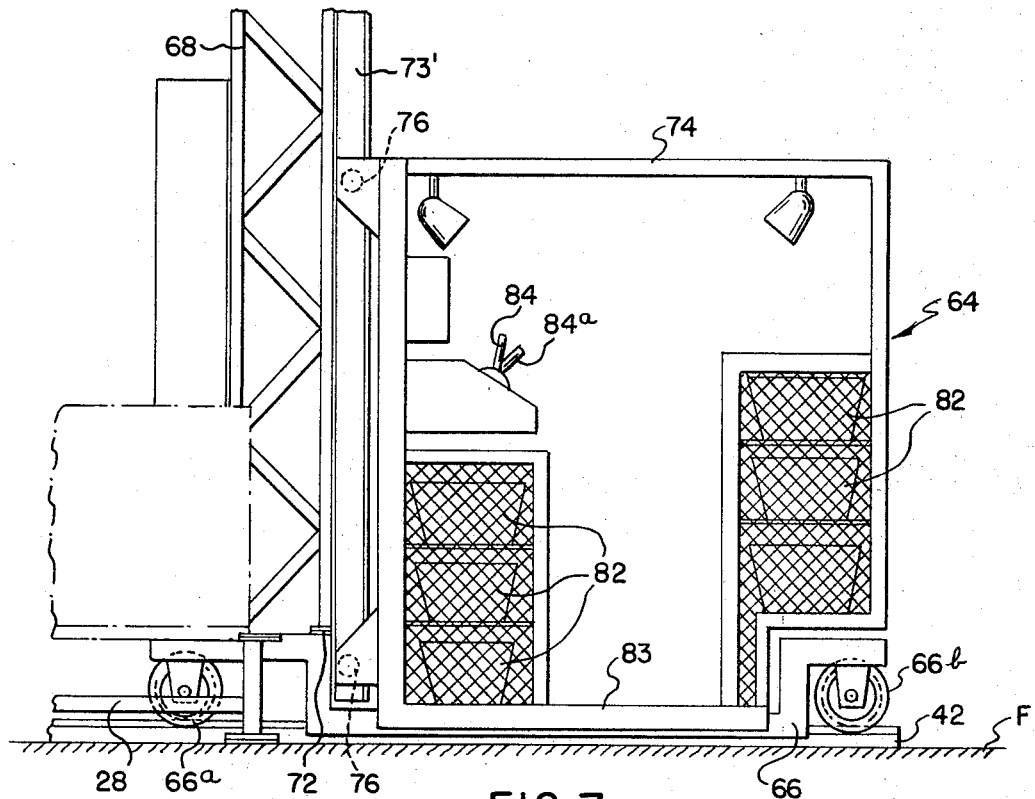
FIG. 7 is an enlarged side-elevational view of the order picker.

The elevator frame 74 as illustrated merely comprises a rectangular framework on which may be mounted receptacles 82 (FIG. 7) adapted for receiving the parts therein removed from the storage bins by the operator of the order picker unit. The operator merely stands on the lower platform portion 83 of the elevator frame 74. and controls the movement of the order picker by means of control handles 84, 84a to locate the order picker unit at the desired bin in the storage complex. In the embodiment illustrated the elevator frame 74 of the order picker is adapted to be moved vertically only to the approximate height of the mast structure 73' which is less than the height of the associated truss. Thus it will be seen that the order picker is adapted to order pick from the lower level of bins in the storage frame, while the upper level of the bins in the storage frame can be used for storage of full loads, which full loads can be moved down into the lower bins as the stock in such lower bins is used up either by being removed by the load carrier mechanism or by being removed by the order-picker unit. It will be seen that by such an arrangement, the load carrier may place the full load in the higher reserve stock storage bins and then such load carrier may move such loads downwardly into the lower order picker area bins as the stock is needed.

The fluid powered motor unit 80 which operates the elevator frame of the order picker, insures that in the event of a leak in the power unit or its fluid system, that the elevator frame will not suddenly drop down to ground level but instead will tend to slowly settle. In one embodiment of storage frame, there may be seven levels of the storage bins, with the top three levels of bins being adapted for receiving reserve stock, while the lower four levels of bins are adapted to be order picker by the order-picker unit.

As can be seen from FIG. 3, open floor space 84 is preferably provided between the guide rail 42 and the confronting storage structure in each respective aisle, which space is preferably of sufficient scope so that conventional manually operated lift trucks can also operate in the aisles for insertion and removal of loads from the storage frame.

Transfer means 90 is provided for transferring the load carrier unit 20 and/or the order picking unit 64 from one travel zone and the storage bay sections associated with that travel zone, to another travel zone, whereby the load carrier and/or the order-picker unit can expeditiously operate in more than one travel zone and thus service a considerable number of aisles and associated storage bay sections in the warehousing system. Such transfer means in the embodiment illustrated comprises a framework including an upper mobile frame assembly 92 and a lower mobile frame assembly 94, coupled together by squaring means 96 (FIG. 4) which insures that the upper frame assembly will move in synchronism with the lower frame assembly upon movement of the transfer mechanism alongside the storage frame in its operation of transferring a load carrier unit or an order-picker unit 64 from one travel zone to another travel zone.

The lower frame assembly 94 may be mounted upon tracks 98 extending parallel with respect to one another and perpendicular to the direction of extension of the travel zones 18 in the storage area. Flanked wheels 100 may be rotatably mounted on the lower frame assembly and support the transfer mechanism in its movement along the rails 98. A suitable power means such as, for instance, an electric motor 101 may be operatively coupled to geared speed reducer means which in turn may be coupled to the wheels 100 of the transfer mechanism, causing rotation of the wheels and thus movement of the transfer frame along the rails. As can best be seen in FIG. 4, the lower frame assembly 94 may comprise a generally U-shaped framework with the depressed portion 108 thereof supporting a rail or track section 110 which in turn supports the wheels 41, 41a of the load carrier unit or the wheels 66a, 66b of the order picker unit 64, when one or the other of the latter units is supported on the transfer means for transmittal from one travel zone to another travel zone. When the transfer mechanism is aligned with the selected storage aisle, the rail section 110 on the lower frame of the transfer assembly is aligned with the rail 42 in the respective storage aisle, thereby making it possible to readily move the load carrier or the order-picker unit onto and off of the transfer mechanism.

The upper frame assembly 92 may comprise a framework having flanged wheels 114, 114a rotatably mounted thereon with the wheels 114 riding on a track 116 (FIG. 2), which in turn is supported on the leading end posts of the storage frame sections. The other wheels 114a of the upper frame assembly are mounted adjacent the innermost end of the upper frame assembly and are adapted to engage the underside of rail or track member 120 (FIGS. 1 and 2) extending lengthwise along the storage frame in parallel relationship with respect to rail member 116. In other words, the reaction of the upper frame assembly against the rail 120 is upwardly via the wheels 114a while the reaction of the wheels 114 on the upper frame assembly is downwardly on track 116. Thus as can be best seen from FIG. 2, the upper frame assembly 92 comprises a cantilever-like arrangement extending outwardly into overlying relationship with respect to the underlying lower frame assembly 94. Depending from the upper frame assembly is a guide rail section 122 (FIGS. 2 and 4) with which the rollers 50 on the load-carrier unit or the rollers 73 on the order-picker unit, are adapted to coact in engaged relationship, when the load carrier or the order picker unit is positioned on the transfer mechanism. When the transfer mechanism is aligned with the selected storage aisle, rail section 122 is aligned with upper guide rail 52 in the respective storage aisle, for readily moving the load-carrier unit or the order-picker unit onto and off of the transfer mechanism.

The aforementioned squaring means 96 may be provided on only one end of the transfer mechanism as best illustrated in FIG. 4, and in the embodiment illustrated comprises a preferably hollow shaft assembly 126 which preferably has universal joint means 128 and angular adjustment coupling means 130 included with the shaft assembly. The shaft assembly is rotatably mounted in upper and lower bearing means 132 pivotally mounted as on 134 to the upper frame assembly 92 and the lower frame assembly 94. Gears 136 are secured to the upper and lower ends of the shaft, and are of the same size and number of teeth. Also rotatably mounted on each bearing member 132 in spaced relation to associated gear member 136 may be an idler roller member 138. Each of gears 136 are adapted for meshing coaction with a gear rack 140, 140a extending along the path of travel of the transfer mechanism. The respective idler roller 138 is adapted to engage a smooth side of the respective gear rack 140 or 140a and thus intercouple the gears 136 to the respective gear rack. It will be seen that during movement of the transfer means along its supporting rails 98, gear 136 on the lower end of the squaring shaft will be caused to rotate, thus rotating the associated squaring shaft and causing rotation of gear 136 on the upper end of the squaring shaft. Since the gears are of the same size and the same number of teeth, rotation of the squaring shaft will maintain the upper and lower assemblies 92 and 94 of the load transfer means in synchronism.

From the foregoing discussion and accompanying drawings it will be seen that the invention provides a novel warehousing system comprising a storage area in which are adapted to be stored loads of stock material, together with a mechanized load carrier mechanism for placing loads into and removing loads from the storage area, together with an order-picker unit of less complexity and size as compared to the load carrier unit, whereby the order-picker unit can move in the storage area and support a workman thereon for selectively removing stock items from the storage bins in the warehousing system, without the necessity of removing the complete load of stock from the bin and moving it to a location for removal of the desired number of stock items and then returning the load back to its original position in the warehousing system. Accordingly, stock orders can be readily filled by the order-picker unit without tying up the load carrier mechanism. The invention also provides a warehousing system comprised of a plurality of storage zones with storage bays disposed along the travel zones for servicing by the load carrier and the order-picker unit, and wherein a load transfer means is provided for moving the load carrier and the order-picker unit from alignment with one travel zone into alignment with another travel zone. The invention also provides an arrangement of load carrier mechanism having adjustable traction means thereon for adjustably aligning the extractor of the load carrier with the storage bins in the warehousing system thereby obviating the necessity of completely accurate alignment of the storage bins and the load carrier during installation of the warehousing system.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

I claim:

1. In a warehousing system comprising in combination, storage means adapted for storing loads of stock therein, said storage means comprising vertically and horizontally oriented storage bins, a plurality of travel zones along which said storage means are disposed, at least one automatic load carrier unit movable in said travel zones for depositing loads of stock into and removing loads of stock from the associated storage means, a manually operated order picking unit in said system for movement in said travel zones for selective picking of stock from the loads on said storage means, and transfer means for transferring at least said load carrier unit from one travel zone to another travel zone, guide means in said system for guiding the movement of said load carrier unit and said order picking unit in said travel zones and for guiding the movement of said transfer means during its transfer operations, said load carrier unit comprising a horizontally movable conveyor portion, a vertically movable elevator portion mounted on said conveyor portion, and a laterally movable load handling portion mounted on said elevator portion for inserting loads into or removing loads from selected of said storage bins, and said order picking unit comprising vertically extending mast structure, and an elevator portion movable vertically on said mast structure, the last mentioned mast structure being of a lesser height than the level of the uppermost storage bins of the associated storage means, said elevator portion and mounted load handling portion of said load carrier unit being movable from the lowermost bin levels to the uppermost bin levels and vice versa for servicing all of the storage bins of the associated storage means, said elevator portion of said order picking unit being movable along said mast structure to a maximum height below the level of said uppermost bins for order picking stock from bin levels below said uppermost bin levels, said load carrier unit being operable to handle full loads of stock to and from the upper bin levels and to move such full loads of stock downwardly into the lower bin levels for order picking by said order picking unit.

2. A warehousing system in accordance with claim 1 wherein said guide means includes track means disposed in said travel zones for supporting and guiding the movements of both said load carrier unit and said order picking unit along said travel zones.

3. A warehousing system in accordance with claim 2 wherein said track means includes upper and lower rails disposed generally centrally with respect to the respective travel zone and between which said load carrier unit and said order-picking unit extend.

4. A warehousing system in accordance with claim 3 wherein each of said units comprises a mobile lower carriage section and a mobile upper frame section with said lower carriage section being adapted to be supported on said lower rail and said upper frame section being adapted to coact with said upper rail, and substantially rigid vertical connecting means extending between said carriage section and said frame section and being substantially rigidly connected thereto, said frame section being movable in synchronism with said carriage section upon movement of said frame section by said connecting means.

5. A warehousing system in accordance with claim 4 wherein said plurality of travel zones are laterally spaced and run generally parallel with respect to one another said storage means comprising vertically and horizontally, and said transfer means being operable to transfer said load carrier unit and said order picking unit from one travel zone to another travel zone, said transfer means comprising a mobile lower carriage section and a mobile upper carriage section, the last mentioned upper and lower carriage sections being movable on track means running generally perpendicular to the direction of extension of each of said travel zones, said last mentioned track means comprising said guide means for said transfer means, and means extending between said last mentioned upper and lower carriage sections for causing synchronized movement of said upper and lower carriage sections.

6. A warehousing system in accordance with claim 5 wherein each said last-mentioned upper and lower carriage sections have rail sections thereon adapted for supporting and guiding said load carrier unit and said order-picking unit when said units are supported on said transfer means, the last-mentioned rail sections being adapted for alignment with the respective upper and lower rails in a selected travel zone for movement of said units onto and from said transfer means.

7. A warehousing system in accordance with claim 4 wherein said connecting means of said order picking unit is coupled to said mast structure of said order picking unit, said elevator portion of said order picking unit comprising platform means movable generally vertically along said mast structure to different elevations and adapted for supporting a workman thereon for order picking, said mast structure of said order picking unit terminating substantially below the upper end of said connecting means of said order picking unit, and plural storage means on said order picking unit for receiving stock removed from selective of said storage means.

8. A warehousing system in accordance with claim 7 including manual control means on said platform means of said order-picking unit for controlling the movement of the latter in said travel zones.

9. A warehousing system in accordance with claim 8 wherein said upper frame section of said order picking unit is rigidly secured to said mast structure by said connecting means, and including means on said upper frame section coacting with said guide means running lengthwise of the respective travel zone for guiding said order picking unit along said respective travel zone.

10. A warehousing system in accordance with claim 9 wherein said connecting means comprises truss structure coupled to said mast structure for rigidifying said mast structure with respect to said carriage section of said order picking unit.

11. A warehousing system in accordance with claim 7 including traction means mounted on said platform means and coacting with said mast structure for guiding said platform means in its vertical movement with respect to said mast structure, and fluid-powered motor means coacting between said platform means and said carriage section for moving said platform means vertically with respect to said mast structure.

12. A warehousing system in accordance with claim 1 wherein said conveyor portion of said load carrier unit comprises a lower carriage having traction means mounted thereto for generally horizontal movement of said load carrier in said travel zone, and means adjustably mounting said traction means on said carriage for varying the vertical position of said traction means with respect to said carriage.

13. A warehousing system in accordance with claim 12 including indicia means for indicating the relative position of said adjustable traction means with respect to said carriage.

14. A warehousing system in accordance with claim 4 including safety means on said upper frame section adapted for abutting coaction with said guide means for preventing forward pitching of said load carrier unit in the event of emergency stopping of the latter during movement thereof.

15. A warehousing system in accordance with claim 4 including safety means on said upper frame section adapted for abutting coaction with said guide means for preventing forward pitching of said order-picking unit in the event of emergency stopping of the latter during movement thereof.

16. A warehousing system in accoradnce with claim 7 wherein said order picking unit includes hydraulic power means for moving said platform means vertically with respect to said mast structure, said hydraulic means comprising a reciprocal double acting hydraulic motor unit coacting between said elevator portion and said carriage section of said order picking unit, the stroke of said motor unit being sufficient to move said elevator portion the full operating height of said mast structure of said order picking unit.

17. A warehousing system in accordance with claim 1 wherein said order picking unit comprises a lower generally horizontally movable carriage and a generally horizontally movable upper frame, means extending vertically between said lower carriage and upper frame and rigidly connecting the latter together, vertically extending track means on said lower carriage, said track means comprising said mast structure and being coupled to said vertically extending means and terminating below the upper extremity of said vertically extending means, said elevator portion of said order picking unit being mounted on said track means, power means for moving said elevator portion vertically on said track means, and manually operable control means on said elevator portion for controlling the movement of said carriage and of said elevator portion of said order picking unit.

18. A warehousing system in accordance with claim 1 wherein said transfer means comprises an upper assembly and a lower assembly and means extending between and coacting with said upper and lower assemblies for causing concurrent synchronized movement of said assemblies during movement of said transfer means.

19. A warehousing system in accordance with claim 1 wherein said transfer means includes means thereon for receiving and supporting both said load carrier unit and said order picking unit, and being operable to transfer both said units from one travel zone to another travel zone.

20. In a warehousing system comprising in combination storage means adapted for storing loads of stock therein, said storage means comprising a plurality of vertically and horizontally oriented storage bins, a plurality of travel zones along which said storage means is disposed, at least one automatic load carrier unit movable in said travel zones for depositing loads of stock into and removing loads of stock from the associated storage means, said load carrier unit comprising a lower support portion and an upper portion rigidly connected to said lower portion by generally vertically extending mast structure, an elevator coacting with said mast structure for movement vertically with respect thereto to substantially the full height of said storage means, extractor means mounted on said elevator and adapted for lateral movement with respect to said elevator for transferring loads between said load carrier unit and said storage means, a manually operated order picking unit in said system adapted for movement in said travel zones for selective picking of stock from the loads on said storage means, guide means for supporting and guiding the movements of both said load carrier unit and said order picking unit along said travel zones, said guide means for said load carrier unit being the same means as the guide means for said order picking unit, transfer means for transferring said load carrier unit and said order picking unit from one travel zone to another travel zone, guide means on said transfer means for guiding and supporting said load carrier unit and said order picking unit on said transfer means during transfer operations by the transfer means, said order picking unit comprising a carriage movable generally horizontally lengthwise of a respective travel zone, mast structure projecting upwardly from said carriage and supported thereon, platform means movable generally vertically along said mast structure of said order picking unit to different elevations and adapted for supporting a workman thereon for order picking, storage means on said order picking unit for receiving stock removed from said storage means, said elevator and mounted extractor means of said load carrier unit being movable to the uppermost bin levels for servicing of the latter, said mast structure of said order picking unit terminating below the uppermost bin levels whereby said platform means of said order picking unit is movable to a lesser height than the height of the uppermost bin levels and is adapted to service the bin levels in said storage means below said uppermost bin levels, said load carrier unit being operable to insert full loads of stock in the higher bin levels and to move such full loads of stock downwardly into the lower bin levels for order picking by said order picking unit as needed due to the depletion of the stock in said lower bin levels.

References Cited

UNITED STATES PATENTS

| | | |
|---|---|---|
| 1,927,677 | 9/1933 | Bennington. |
| 2,490,171 | 12/1949 | Swahnberg _ _ _ _ _ _ _ _ _ _ _ 280—43 |
| 2,815,133 | 12/1957 | Asheim et al. |
| 3,033,392 | 5/1962 | Baumann et al. |
| 3,283,924 | 11/1966 | Chasar. |

FOREIGN PATENTS

| | | |
|---|---|---|
| 229,880 | 1/1960 | Australia. |
| 841,390 | 7/1960 | Great Britain. |
| 992,513 | 5/1965 | Great Britain. |
| 1,416,298 | 9/1965 | France. |
| 57,826 | 7/1946 | Netherlands. |
| 206,541 | 8/1966 | Sweden. |
| 276,066 | 9/1951 | Switzerland. |

GERALD M. FORLENZA, Primary Examiner

R. B. JOHNSON, Assistant Examiner

UNITED STATES PATENT OFFICE
CERTIFICATE OF CORRECTION

Patent No. 3,526,327  September 1, 1970

Wayne G. Atwater

It is certified that error appears in the above identified patent and that said Letters Patent are hereby corrected as shown below:

Column 9, lines 53 and 54, cancel "said storage means comprising vertically and horizontally,".

Signed and sealed this 16th day of February 1971.

(SEAL)
Attest:

Edward M. Fletcher, Jr.
Attesting Officer

WILLIAM E. SCHUYLER, JR.
Commissioner of Patents